US007201082B2

(12) United States Patent
Yamada et al.

(10) Patent No.: US 7,201,082 B2
(45) Date of Patent: Apr. 10, 2007

(54) AUTOMOBILE PEDAL SUPPORTING STRUCTURE

(75) Inventors: Hideto Yamada, Fuchu-cho (JP); Yasunori Sasaki, Fuchu-cho (JP); Kiyonobu Takahashi, Fuchu-cho (JP); Akira Nakayama, Kaito-cho (JP)

(73) Assignee: Mazda Motor Corporation, Hiroshima (JP)

( * ) Notice: Subject to any disclaimer, the term of this patent is extended or adjusted under 35 U.S.C. 154(b) by 517 days.

(21) Appl. No.: 10/669,684

(22) Filed: Sep. 25, 2003

(65) Prior Publication Data

US 2004/0055409 A1 Mar. 25, 2004

(30) Foreign Application Priority Data

Sep. 25, 2002 (JP) ............................ 2002-279265

(51) Int. Cl.
*G05G 1/14* (2006.01)
*B60K 28/10* (2006.01)

(52) U.S. Cl. ........................... 74/512; 74/560; 180/274

(58) Field of Classification Search .................. 74/512, 74/513, 560; 180/274, 275, 271; *B60T 7/06*
See application file for complete search history.

(56) References Cited

U.S. PATENT DOCUMENTS 4,009,623 A * 3/1977 Smith et al. .................. 74/512

(Continued)

FOREIGN PATENT DOCUMENTS

EP 1 179 461 A2 2/2002

(Continued)

OTHER PUBLICATIONS

Notice of Reason for Rejection, Mailed on Aug. 23, 2005.

(Continued)

*Primary Examiner*—Vinh T. Luong
(74) *Attorney, Agent, or Firm*—Nixon Peabody LLP; Donald R. Studebaker

(57) ABSTRACT

The automobile pedal supporting structure includes a first bracket 5, the front end of the first bracket 5 being fixed on a dash panel 1, and the rear end of the first bracket 5 being fixed on a vehicle-side member 8 which is more rigid than the dash panel 1 so that the first bracket 5 can be removed from the vehicle-side member 8, and a second bracket 6, the front-end lower part of the second bracket 6 being pivotally attached to the first bracket 5 so that the second bracket 6 can swing, the rear-end upper part of the second bracket 6 being fixed on the vehicle-side member 8 so that the second bracket 6 can be removed from the vehicle-side member 8, and an operation pedal 4 being pivotally attached to the second bracket 6 so that the operation pedal 4 can swing, in which the first bracket 5 and the second bracket 6 are placed to substantially overlap each other, the rear-end upper part of the second bracket 6 are fixed together with the first bracket 5 on the vehicle-side member 8, and a turn promoting member 12 is provided, which is connected from the vehicle-side member 8 through the rear-end outside of the first bracket 5 to the upper part of the second bracket 6 and promotes a turn of the second bracket 6 toward the vehicle-lower side by a backward movement of the first bracket 5 toward the vehicle-rear side.

8 Claims, 4 Drawing Sheets

U.S. PATENT DOCUMENTS

| | | | | |
|---|---|---|---|---|
| 4,598,457 | A * | 7/1986 | Kiwak et al. | 29/411 |
| 5,797,467 | A * | 8/1998 | Watanabe | 180/271 |
| 6,006,626 | A * | 12/1999 | Notake et al. | 74/512 |
| 6,182,526 | B1 * | 2/2001 | Brooks | 74/512 |
| 6,499,376 | B2 * | 12/2002 | Thistleton et al. | 74/512 |
| 6,752,038 | B2 * | 6/2004 | Cordero | 74/512 |
| 7,131,348 | B2 * | 11/2006 | Fall | 74/512 |
| 2003/0221512 | A1 * | 12/2003 | Sando | 74/560 |

FOREIGN PATENT DOCUMENTS

| | | |
|---|---|---|
| JP | 09-123948 | 5/1997 |
| JP | 11-115698 | 4/1999 |
| JP | 11-139346 | 5/1999 |
| JP | 2000-264180 | 9/2000 |
| JP | 2001-138878 | 5/2001 |
| JP | 2001-138878 A | 5/2001 |
| JP | 2002-087229 | 3/2002 |
| WO | WO 02/22412 A1 | 3/2002 |

OTHER PUBLICATIONS

Patent Abstracts of Japan vol. 1999, No. 2, Feb. 26, 1999, & JP 10 310036 A (Honda Motor Co. Ltd.) Nov. 24, 1998 *Abstract*.

Patent Abstracts of Japan vol. 2000, No. 12, Jan. 3, 2001 & JP 2000 264180 A (Daihatsu Motor Co.) Sep. 26, 2000 Abstract.

Patent Abstracts of Japan vol. 2000, No. 25, Apr. 12, 2001 & JP 2001 219828 A (Mazda Motor Corp.) Aug. 14, 2001 *Abstract**.

European Search Report Dated Dec. 2, 2003.

* cited by examiner

AUTOMOBILE PEDAL SUPPORTING STRUCTURE

BACKGROUND OF THE INVENTION AND RELATED ART STATEMENT

1. Field of the Invention

This invention relates to a supporting structure for an operation pedal of an automobile.

2. Description of the Related Art

In general, drivers attempt to stop their cars by stepping deep on a brake pedal when they encounter an imminent crash. But in fact, many of them fail to stop the car and bump in a state of stamping on the brake pedal.

In such a case, the front part of a vehicle crushes with absorbing the energy of a crash. Its engine placed inside an engine room moves back, pushing a master cylinder of a brake unit located behind the engine. Herein, the master cylinder is connected to the brake pedal located behind a dash panel via an operating rod. Thus, the master cylinder pushes back the brake pedal via the operating rod.

As a result, there is a disadvantage in that the driver has a crash load on his foot because he is stepping deep on the brake pedal until immediately before the crash, and then receives a strong kickback, making an impact on the foot.

Conventionally, various measures are suggested to cope with such a problem. Japanese Patent Laid-Open No. 2001-138878 specification, for example, is configured by comprising: a first bracket fixed on a dash panel; a second bracket, an operation pedal being pivotally attached to the second bracket so that the operation pedal can swing, the front-end lower part of the second bracket being pivotally attached to the first bracket so that the second bracket can swing, the rear-end upper part of the second bracket being fixed on a vehicle body-side member so that the second bracket can be removed from the vehicle body-side member by an impact load at the time of an automobile crash; and a compressed spring, which is disposed in a compressed state between the first bracket and the second bracket and promotes a backward turn around the pivotally attached position of the front-end lower part of the second bracket.

According to such a prior art, at the time of an automobile crash, the rear-end upper part of the second bracket is removed from the vehicle body-side member and makes a backward turn around the pivotally attached position. As a result, the lower part of a brake pedal moves forward, preventing the brake pedal from moving back. Thereby, a crash load can be prevented from being laid on the driver's foot. In addition, the compressed spring which promotes the backward turn of the second bracket is disposed in a compressed state, so that the second bracket can be turned without fail by the force of the compressed spring.

Furthermore, Japanese Patent Laid-Open No. H11-139346 specification is configured by comprising: a first pedal bracket fixed on a first vehicle-body component member; a second pedal bracket, a vehicle-used pedal being pivotally attached to the second pedal bracket so that the vehicle-used pedal can swing, the front-end side of the second pedal bracket being supported on the first pedal bracket so that the second pedal bracket can swing, and the rear-end side of the second pedal bracket being fixed on a second vehicle-body component member at a more vehicle rearward-side than the first vehicle-body component member, the second vehicle-body component member being more rigid than the first vehicle-body component member; and a guide member for displacing the rear end of the second pedal bracket toward the vehicle lower-side at the time of an automobile crash.

According to such a prior art, at the time of an automobile crash, the rear end of the second pedal bracket is removed from the second vehicle-body component member and makes a backward turn around the pivotally attached position. As a result, the lower part of a brake pedal moves forward, preventing the brake pedal from moving back. Thereby, a crash load can be prevented from being laid on the driver's foot. In addition, the guide member for displacing the second pedal bracket toward the vehicle lower-side is provided, so that the second pedal bracket can be displaced without fail toward the vehicle lower-side.

However, the above described former prior art is configured so that the compressed spring promotes the turn of the second bracket, and thus, you have to set the force of the compressed spring. This presents a disadvantage in that if the set force is too weak, then the compressed spring will not be able to promote the turn of the second bracket adequately. On the other hand, if it is too strong, then the compressed spring will keep exerting its turn-promoting force on the second bracket and also on the driver's foot, affecting the driver's regular braking operation.

According to the above described latter prior art, the guide member for displacing the second pedal bracket toward the vehicle lower-side is configured by a slide plate attached firmly to an instrument-panel reinforcement behind the operation pedal. Herein, the instrument-panel reinforcement is located away from the operation pedal. This makes it difficult to allow the second pedal bracket to come into contact with the slide plate and be displaced toward the vehicle lower-side. The instrument-panel reinforcement or the slide plate attached firmly to the instrument-panel reinforcement of larger size is required to solve the problem.

In consideration of the aforementioned problems, it is an object of the present invention to provide an automobile pedal supporting structure, which is capable of preventing the operation pedal from moving back by ensuring a turn of the operation pedal, without affecting the driver's pedal operation and with keeping the vehicle body from becoming larger.

SUMMARY OF THE INVENTION

In order to attain the above described object, a means of solving the problems according to the present invention is as follows.

A one aspect of the present invention is constructed such that the automobile pedal supporting structure for an operation pedal disposed behind a dash panel of an automobile comprises: a first bracket, the front end of the first bracket being fixed on the dash panel, and the rear end of the first bracket being fixed on a vehicle-side member which is more rigid than the dash panel so that the first bracket can be removed from the vehicle-side member by a crash load on the front side of the automobile; and a second bracket, the front-end lower part of the second bracket being pivotally attached to the first bracket so that the second bracket can swing, the rear-end upper part of the second bracket being fixed on the vehicle-side member so that the second bracket can be removed from the vehicle-side member by a crash load on the front side of the automobile, and the operation pedal being pivotally attached to the second bracket so that the operation pedal can swing, wherein: the first bracket and the second bracket are placed so as to substantially overlap each other; the rear end of the first bracket and the rear-end upper part of the second bracket are fixed together on the vehicle-side member; and a turn promoting member is provided, which is connected from the vehicle-side member through the rear-end outside of the first bracket to the upper part of the second bracket and promotes a turn of the second bracket toward the vehicle-lower side by using a backward movement of the first bracket toward the vehicle-rear side caused by a crash load on the front side of the automobile.

According to the aforementioned invention, when the dash panel is pushed by an engine and moves back toward the vehicle-rear side at the time of an automobile crash, the first bracket fixed on the dash panel and the second bracket fixed together with the first bracket are both removed from the vehicle-side member and moves back toward the vehicle-rear side. At this time, the turn promoting member, which is connected from the vehicle-side member through the rear-end outside of the first bracket to the rear-end upper part of the second bracket, is displaced toward the vehicle-rear side by a backward movement of the first bracket toward the vehicle-rear side. Then, the displacement prompts the rear-end upper part of the second bracket to turn toward the vehicle-rear side on the pivot of the front-end lower part thereof.

In addition, therefore, using a backward movement of the first bracket toward the vehicle-rear side caused at the time of an automobile crash, the second bracket can certainly be turned toward the vehicle-rear side. This enables the lower part of the operation pedal to move toward the vehicle-front side, preventing the operation pedal from moving back. In addition, this aspect is configured so that the turn promoting member promotes a turn of the second bracket only when the first bracket is displaced toward the vehicle-rear side. Thereby, no effect will be produced on the driver's regular pedal operation. Moreover, it is constructed such that the turn promoting member is located between the vehicle-side member and the second bracket and is connected to both. This will permit the turn promoting member to approach the operation pedal, avoiding making the vehicle body larger.

These and other objects, features, and advantages of the present invention will become more apparent upon reading the following detailed description along with the accompanying drawings.

DETAILED DESCRIPTION OF THE PREFERRED EMBODIMENTS OF THE INVENTION

Hereinafter, an embodiment of the automobile pedal supporting structure according to the present invention will be described with reference to the attached drawings.

Figure 1:
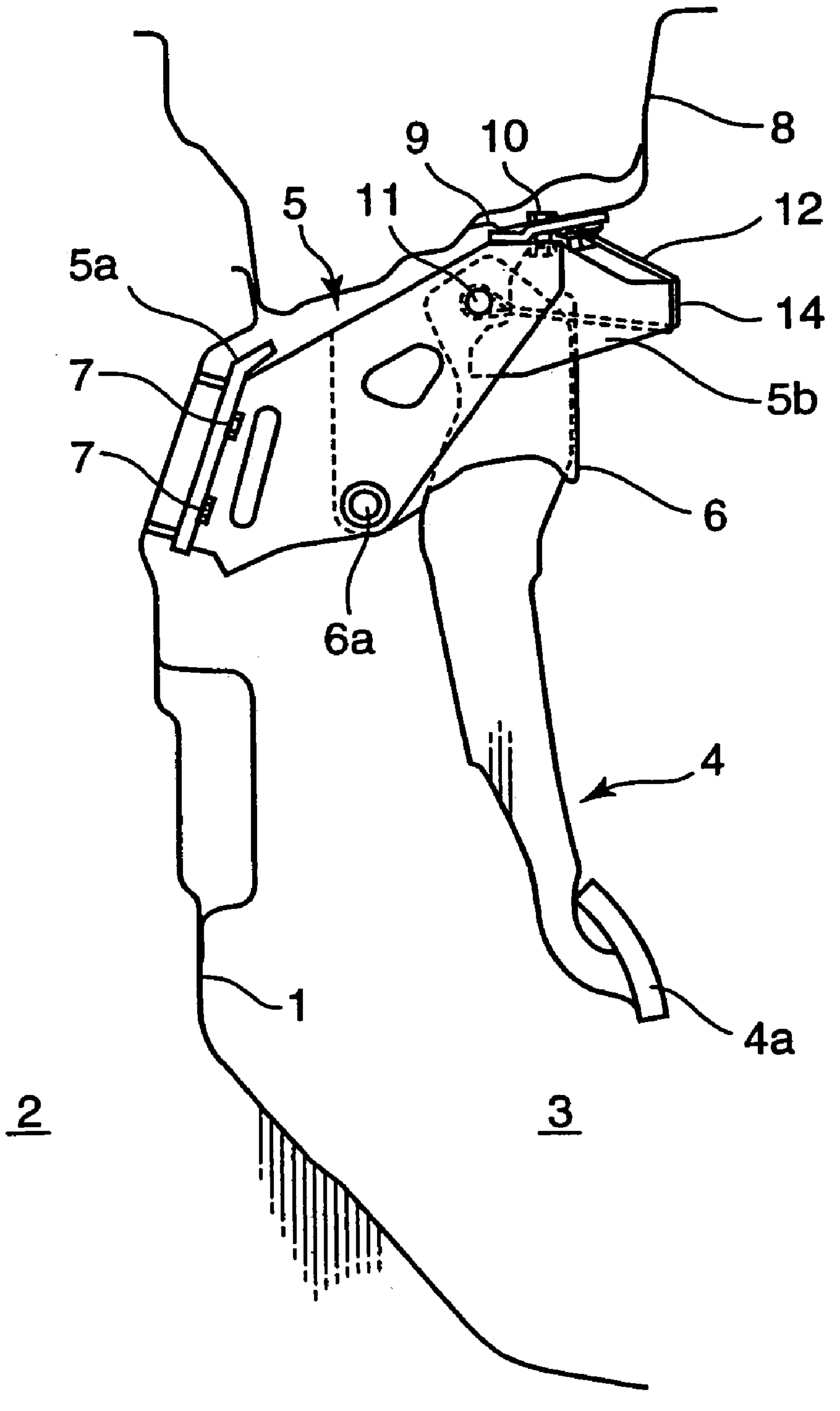
FIG. 1 is a side view showing the whole configuration of an automobile pedal supporting structure according to this embodiment.

FIG. 1 is a vertical sectional view showing the whole configuration of the embodiment of the automobile pedal supporting structure according to the present invention. Reference numeral 1 denotes a dash panel configuring a section of an automobile. On its front side (or on the left side in the figure) is formed an engine room 2 housing an engine (not shown) and on its rear side (or on the right side in the figure), a vehicle room 3.

Behind the lower part of the dash panel 1 or at a lower-front location of the vehicle interior 3, a brake pedal 4 is fixed by a first bracket 5 and a second bracket 6 (mentioned later). Herein, the brake pedal 4 is used as an operation pedal on which the driver stamps.

The first bracket 5 is fixed to the lower-part rear surface of the dash panel 1 by using bolt members 7,7 . . . . The first bracket 5 is provided with a substantially plate-like fixing portion 5*a*, and a supporting portion 5*b* having a downward-opened substantially U-shaped cross-section. The fixing portion 5*a* is fixed to the lower-part rear surface of the dash panel 1 by the bolt members 7,7 . . . , at a predetermined distance away from the surface. The supporting portion 5*b* extends upward and backward from the fixing portion 5*a*.

The rear-end upper part of the supporting portion 5*b* of the first bracket 5 is attached to an attachment bracket 9 by bolt members 10,10. The attachment bracket 9 extends in the vehicle-width directions and is attached to the lower surface of a cowl panel 8 used as the vehicle body-side member in the vehicle room 3. The first bracket 5 moves back toward the vehicle-rear side and can be removed from the attachment bracket 9 by a heavier load than a predetermined value at the time of an automobile crash. Herein, the removable attachment structure of the supporting portion 5*b* of the first bracket 5 to the attachment bracket 9 will later be described in detail, together with an attachment of the second bracket 6.

The cowl panel 8 is set to be more rigid than the dash panel 1 so as not to substantially move back at the time of an automobile crash. This could help secure space for passengers in the vehicle room 3.

Inside the supporting portion 5*b* of the first bracket 5, the second bracket 6 is placed to substantially overlap with the supporting portion 5*b* in the vehicle-width directions of an automobile.

The second bracket 6, in the same way as the supporting portion 5*b* of the first bracket 5, has a downward-opened U-shaped cross-section. The front-end lower part of the second bracket 6 is pivotally attached to the front end-side of the supporting portion 5*b* of the first bracket 5 by using a caulking pin 6*c* so that the second bracket 6 can swing along the vertical plane. The rear-end upper part thereof, together with the supporting portion 5*b* of the first bracket 5, is attached to the cowl panel 8 by the bolt members 10,10. The second bracket 6 moves back toward the vehicle-rear side and can be removed from the cowl panel 8 by a heavier load than a predetermined value at the time of an automobile crash.

Figure 2A:
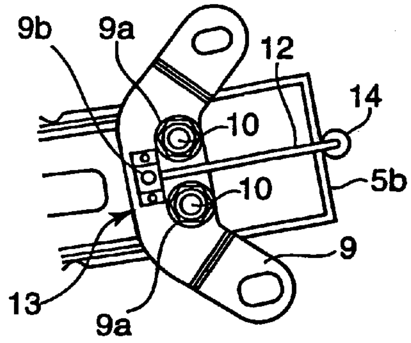
FIG. 2A is a top plan view showing an attachment bracket according to the embodiment.
Figure 2B:
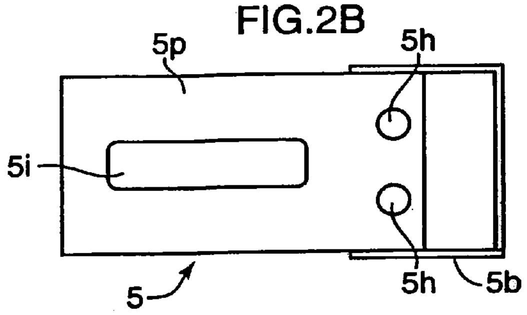
FIG. 2B is a plan view showing a first bracket 5.
Figure 2C:
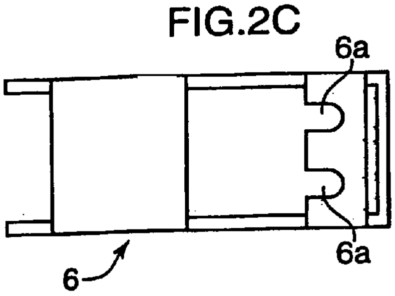
FIG. 2C is a plan view showing a second bracket 6.
Figure 2D:
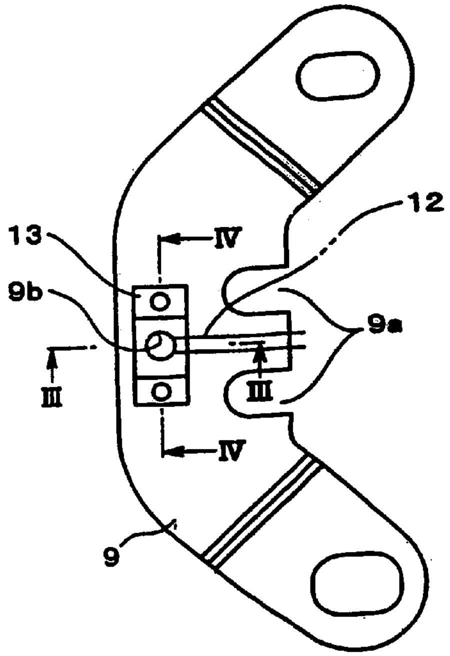
FIG. 2D is a plan view showing a attachment bracket 9.

As shown in FIG. 2A, the attachment bracket 9, the upper-wall part on the rear-end upper part-side of the supporting portion 5*b* of the first bracket 5 and the upper-wall part on the rear-end upper part-side of the second bracket 6 are placed to overlap one another from above to below in the mentioned order. Those members are each fixed together by the bolt members 10,10. As shown in FIG. 2A, the attachment bracket 9 includes substantially semicircular notch portions 9*a* having its notch on the vehicle-rear side. The opening of the notch portion 9*a* is formed to be larger than the diameter of the bolt member 10. Each part consisting a structure shown in FIG. 2A is respectively shown in FIGS. 2B to 2D. In FIG. 2B, a first bracket 5 in its plan view, in FIG. 2C, a second bracket 6 in its plan view and in FIG. 2D, an attachment bracket 9 in its plan view are respectively shown. The first bracket 5, shown in FIG. 2B, on its upper wall portion 5*p*, is provided with an elongated hole 5*i* for reducing an overall weight of the first bracket 5 and two through holes 5*h* for bolt members 10, 10. The second bracket 6, as shown in FIG. 2C, is formed with two notch portions 6*a*, 6*a* opening toward frontal direction. The attachment bracket 9 is provided with two notch portions 9*a*, 9*a* opening toward rearward direction. In the ordinary state, all of a first bracket 5, a second bracket 6, and an attachment bracket 9 are tied up together by a bolt & nut means having a bolt 10 going through the holes 5*h*, the notch portions 6*a*, and the notch portions 9*a*.

When a heavier load than a predetermined value is laid on the dash panel 1 at the time of an automobile crash, the dash panel 1 moves back largely, causing the first bracket 5 to move back largely. On the other hand, the cowl panel makes almost no backward movement because of its higher rigidity than the dash panel 1. As a result, the backward movement of the first bracket 5 prompts the bolt members 10,10 to come off the notch portion 9*a*.

More specifically, with the above structure, when a heavier load than a predetermined value is laid on the dash panel 1, the dash panel 1 moves back largely, causing the bolts 10 to disengaged from the notch portions 9*a* of the attachment bracket 9, thereby the first bracket 5 and the second bracket 6 are disengaged from the attachment bracket 9. Thereafter, a clearance is formed in an axial direction of the bolt 10 due to the loss of the thickness of the attachment bracket 9, allowing the second bracket 6 to be disengaged from the first bracket 5 with the pulling force generated in the wire member 12.

A pedal supporting shaft 11 extending in the vehicle-width directions of an automobile is hung on the inner surface of right and left vertical walls of the second bracket 6. The pedal supporting shaft 11 supports the upper end of the brake pedal 4 so that the brake pedal 4 can swing along the vertical plane. The brake pedal 4 having the shape of a stick is provided with a pedal portion 4*a* at its lower part, on which the driver puts his foot and steps deep.

A metal wire member 12 used as the turn promoting member is located between the attachment bracket 9 and the pedal supporting shaft 11 disposed inside the second bracket 6 and is connected to both.

Figure 3:
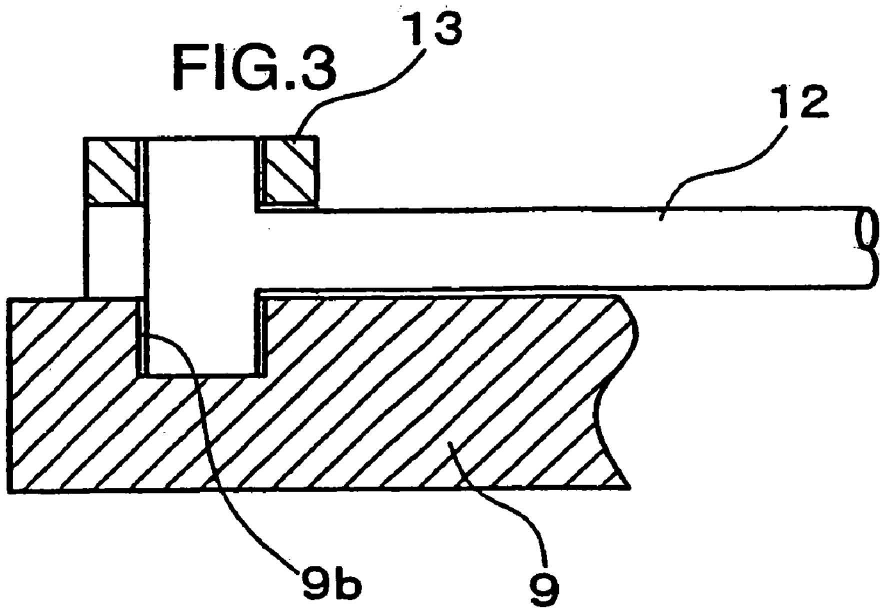
FIG. 3 is a vertical sectional view showing the structure of the attachment of a wire member on the side of the attachment bracket according to the embodiment.
Figure 4:
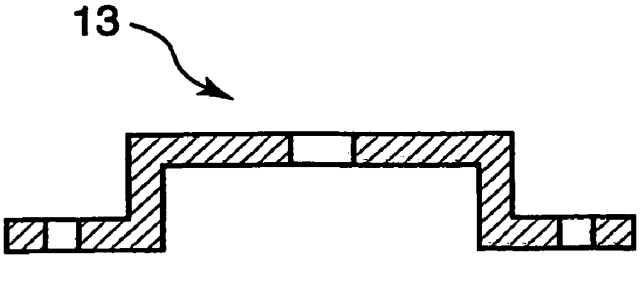
FIG. 4 is a vertical sectional view showing a cover member according to the embodiment.

As shown in FIG. 3, the wire member 12 has a substantially T-shaped end on the side of the attachment bracket 9. A tip of the T-shaped end is inserted in a concave portion 9*b* formed in the upper surface of the attachment bracket 9, and in this state, a cover member 13 shown in FIG. 4 is fixed from above to fix the wire member 12 on the side of the attachment bracket 9.

As shown in FIG. 1, the wire member 12 has a ring-shaped end on the side of the pedal supporting shaft 11. The wire member 12 is attached to the pedal supporting shaft 11 by hanging the ring-shaped end on the shaft 11.

Figure 5:
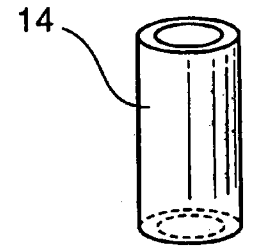
FIG. 5 is a perspective view showing a guide member according to the embodiment.

The middle part of the wire member 12 is inserted into a guide member 14 disposed at the rear end of the supporting portion 5*b* of the first bracket 5. The guide member 14 has an engaging claw, which can be engaged with the rear end of the supporting portion 5*b*. However a manner of fixing a guide member 14 to the rear end of the supporting portion 5*b* is not limited thereto, thus any other reasonable way can be applied to the fixing method of the guide member 14 to the rear end supporting portion 5*b*. As shown in FIG. 5, the guide member 14 has a hollow cylindrical shape. The guide member 14 has the function of guiding the wire member 12 so that the wire member 12 can be prevented from coming off the rear end of the supporting portion 5*b* of the first bracket 5. The guide member 14 is made of resin to reduce the frictional resistance generated while it is coming into contact with the metal wire member 12. The guide member 14 has another function of restricting a transversal movement of the wire member 12 because the wire member 12 slides along inside of the guide member 14 extending in a vertical direction. It should be noted that a transversal direction is meant to be a left-to-right direction of a vehicle as opposing a front-to-rear direction (longitudinal direction).

Hereinafter, an explanation of advantages at the time of an automobile crash will be made based on in FIG. 6.

Figure 6:
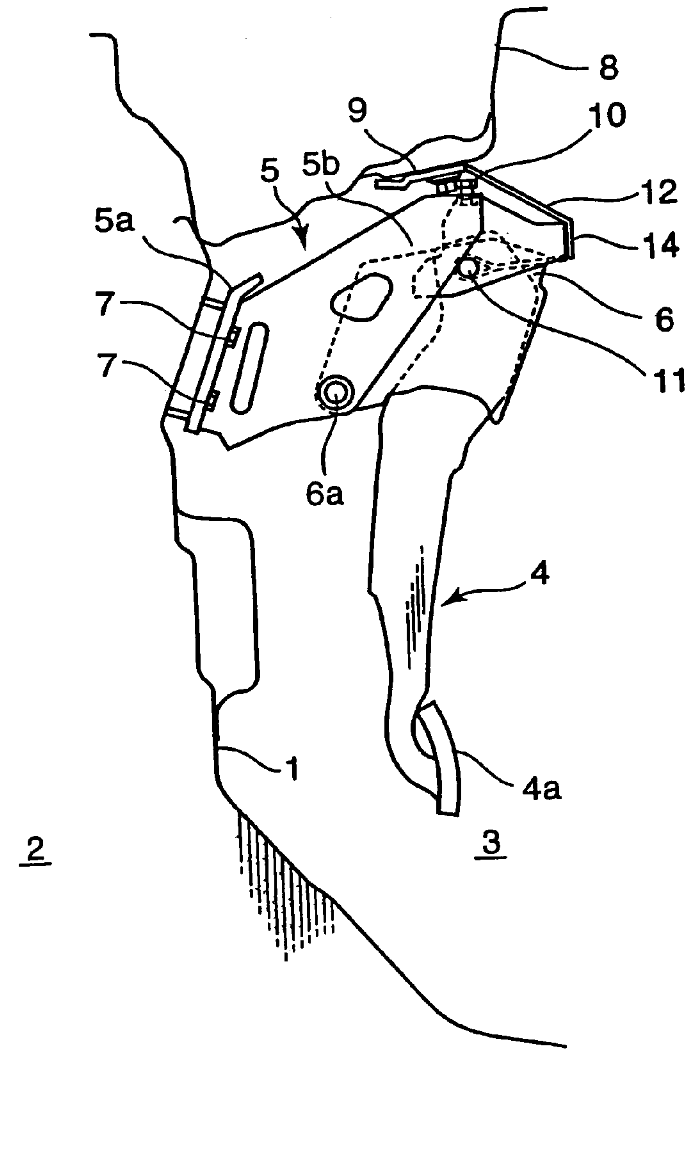
FIG. 6 is a side view showing a displacement of a brake pedal at the time of a crash according to the embodiment.

As shown in FIG. 6, when a heavier load than a predetermined value is laid on the dash panel 1 at the time of an automobile crash, the dash panel 1 moves back largely, causing the first bracket 5 to move back largely. On the other hand, the cowl panel makes almost no backward movement because of its higher rigidity than the dash panel 1. As a result, the backward movement of the first bracket 5 prompts the bolt members 10,10 to come off the notch portion 9*a*. In this time, the wire member 12, which is connected from the cowl panel 8 through the rear-end outside of the first bracket 5 over to the pedal supporting shaft 11 disposed inside the second bracket 6, is displaced toward the vehicle rear-side by the backward movement of the first bracket 5 toward the vehicle rear-side. Specifically, the length of the wire member 12 from the first bracket 5 to the guide member 14 disposed at the rear end of the second bracket 6 becomes greater. Thereby, the wire member 12 is pulled so as to shorten the length of the wire member 12 from the guide member 14 to the pedal supporting shaft 11. This displacement of the wire member 12 allows the rear-end upper part of the second bracket 6 to turn toward the vehicle-lower side on the pivotally attached axis (or the caulking pin 6*c*) of the front-end lower part of the second bracket 6.

According to this embodiment, therefore, using a backward movement of the first bracket 5 toward the vehicle-rear side caused at the time of an automobile crash, the brake pedal 4 can be turned without fail. This enables the pedal portion 4*a* of the brake pedal 4 to move toward the vehicle-front side, preventing the brake pedal 4 from moving back. In addition, this embodiment is configured so that the wire member 12 promotes a turn of the second bracket 6 only when the first bracket 5 is displaced toward the vehicle-rear side. Thereby, no effect will be produced on the driver's regular pedal operation. Moreover, it is constructed such that the wire member 12 is located between the cowl panel 8 and the second bracket 6 and is connected to both. This will permit the wire member 12 to approach the brake pedal 4, avoiding making the vehicle body larger.

This embodiment is constructed such that the wire member 12 is in contact with the rear-end outside of the first bracket 5. Thereby, the wire member 12 stretches longer toward the vehicle rear-side as the first bracket 5 moves back by a longer distance. This can make larger a turn of the second bracket 6 toward the vehicle lower-side.

The resinous guide member 14 is provided at the contact location of the wire member 12 with the rear end of the first bracket 5. Thereby, it can guide the movement of the wire member 12 so that the wire member will not come off the rear end of the supporting portion 5*b* of the first bracket 5. Furthermore, the guide member 14 is made of resin, so that the frictional resistance between the metal wire member 12 and the rear end of the first bracket 5 can be reduced, making the turn of the second bracket 6 smoother.

In this embodiment, the brake pedal 4 is used as the operation pedal, but a clutch pedal may also be used instead.

In addition, in the embodiment, the cowl panel 8 is used as the vehicle-side member which the rear end of the first bracket 5 is fixed on, but any vehicle-side member may also be used instead as long as it is placed near the operation pedal.

Moreover, the embodiment gives an example of the resinous guide member 14 being provided at the rear end of the first bracket 5. But resin may also be affixed on the rear end of the first bracket 5.

In summary, a first aspect of the present invention is constructed such that the automobile pedal supporting structure for an operation pedal disposed behind a dash panel of an automobile comprises: a first bracket, the front end of the first bracket being fixed on the dash panel, and the rear end of the first bracket being fixed on a vehicle-side member which is more rigid than the dash panel so that the first bracket can be removed from the vehicle-side member by a crash load on the front side of the automobile; and a second bracket, the front-end lower part of the second bracket being pivotally attached to the first bracket so that the second bracket can swing, the rear-end upper part of the second bracket being fixed on the vehicle-side member so that the second bracket can be removed from the vehicle-side member by a crash load on the front side of the automobile, and the operation pedal being pivotally attached to the second bracket so that the operation pedal can swing, wherein: the first bracket and the second bracket are placed so as to substantially overlap each other; the rear end of the first bracket and the rear-end upper part of the second bracket are fixed together on the vehicle-side member; and a turn promoting member is provided, which is connected from the vehicle-side member through the rear-end outside of the first bracket to the upper part of the second bracket and promotes a turn of the second bracket toward the vehicle-lower side by using a backward movement of the first bracket toward the vehicle-rear side caused by a crash load on the front side of the automobile.

According to the first aspect of the present invention, when the dash panel is pushed by an engine and moves back toward the vehicle-rear side at the time of an automobile crash, the first bracket fixed on the dash panel and the second bracket fixed together with the first bracket are both removed from the vehicle-side member and moves back toward the vehicle-rear side. At this time, the turn promoting member, which is connected from the vehicle-side member through the rear-end outside of the first bracket to the rear-end upper part of the second bracket, is displaced toward the vehicle-rear side by a backward movement of the first bracket toward the vehicle-rear side. Then, the displacement prompts the rear-end upper part of the second bracket to turn toward the vehicle-rear side on the pivot of the front-end lower part thereof.

According to the first aspect of the present invention, therefore, using a backward movement of the first bracket toward the vehicle-rear side caused at the time of an automobile crash, the second bracket can certainly be turned toward the vehicle-rear side. This enables the lower part of the operation pedal to move toward the vehicle-front side, preventing the operation pedal from moving back. In addition, this aspect is configured so that the turn promoting member promotes a turn of the second bracket only when the first bracket is displaced toward the vehicle-rear side. Thereby, no effect will be produced on the driver's regular pedal operation. Moreover, it is constructed such that the turn promoting member is located between the vehicle-side member and the second bracket and is connected to both. This will permit the turn promoting member to approach the operation pedal, avoiding making the vehicle body larger.

A second aspect of the present invention is constructed such that the turn promoting member is configured by a wire member connected from the vehicle-side member through the rear-end outside of the first bracket over to the upper part of the second bracket.

According to the second aspect of the present invention, at the time of an automobile crash, the vehicle-side member moves larger than the dash panel toward the vehicle-rear side because the former is more rigid than the latter. Thus, the distance from the vehicle-side member to the rear-end part of the first bracket becomes longer at a crash time than during a regular operation time. Thereby, the wire member is pulled so as to shorten the distance from the rear end of the first bracket to the rear-end upper part of the second bracket. This movement of the wire member allows the rear-end upper part of the second bracket to turn toward the vehicle-lower side.

According to the second aspect of the present invention, therefore, using a backward movement of the first bracket toward the vehicle-rear side, a change is made in the relation between the distance from the vehicle-side member to the rear end of the first bracket and the distance from the rear end of the first bracket to the rear-end upper part of the second bracket. As a result, a turn of the second bracket can be promoted toward the vehicle-lower side.

A third aspect of the present invention is constructed such that a guide member in which the wire member is inserted is provided at the rear end of the first bracket.

According to the third aspect of the present invention, the guide member is provided at the contact location of the wire member with the rear end of the first bracket. Thereby, it can guide the movement of the wire member so that the wire member will not come off the rear end of the first bracket.

A fourth aspect of the present invention is constructed such that the guide member is made of resin.

According to the fourth aspect of the present invention, the frictional resistance between the wire member and the rear end of the first bracket can be reduced, making the turn of the second bracket smoother.

A fifth aspect of the present invention is constructed such that the turn promoting member is configured so that a larger movement of the first bracket toward the vehicle-rear side makes the turn of the second bracket larger.

According to the fifth aspect of the present invention, if the first bracket moves larger toward the vehicle-rear side, then that will allow the second bracket to move larger.

A sixth aspect of the present invention is constructed such that the operation pedal is a brake pedal.

According to the sixth aspect of the present invention, the brake pedal can be prevented from moving back at the time of an automobile crash.

This application is based on Japanese patent application No. 2002-279265, filed in Japan Patent Office on Sep. 25, 2002, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An automobile pedal supporting structure for an operation pedal disposed behind a dash panel of an automobile, comprising:

a first bracket having front and rear ends which allow the first bracket to be removed from a vehicle-side member by a crash load on a front side of the automobile, the front end of the first bracket being fixed on the dash panel and the rear end of the first bracket being fixed on the vehicle-side member which is more rigid than the dash panel a second bracket, being substantially wrapped with the first bracket to pivotally support the operation pedal by a frontal lower pivotal point, and having a front-end lower part being pivotally attached to the first bracket so as to allow the second bracket to swing and a rear-end upper part being fixed on the vehicle-side member through the rear end of the first bracket so as to allow the second bracket to be removed from the vehicle-side member by the crash load on the front side of the automobile extending from the vehicle-side member through the rear-end outside of the first bracket to the upper part of the second bracket so as to promote a turn of the second bracket toward the vehicle-lower side as a result of a backward movement of the first bracket toward the vehicle-rear side caused by the crash load on the front side of the automobile; and a pedal supporting shaft provided on the second bracket such that the pedal supporting shaft extends through an upper area of the second bracket, wherein the turn promoting member includes a wire member having connected ends one of which is connected to the pedal supporting shaft and the other to the vehicle-side member.

2. The automobile pedal supporting structure according to claim 1, wherein a movement restriction member is provided on said rear end of the first bracket so that a transversal movement of the wire with respect to the rear end portion of the first bracket is prevented.

3. The automobile pedal supporting structure according to claim 2, wherein said movement restriction member includes a guide member in which the wire member is inserted is provided at the rear end of the first bracket.

4. The automobile pedal supporting structure according to claim 3, wherein the guide member is made of resin.

5. The automobile pedal supporting structure according to claim 1, wherein the turn promoting member is configured so that a larger backward movement of the first bracket toward the vehicle-rear side makes the turn of the second bracket larger.

6. The automobile pedal supporting structure according to claim 1, wherein the operation pedal is a brake pedal.

7. The automobile pedal supporting structure according to claim 1, wherein the both connected ends of the wire member are positioned in a frontal side of the rear end of the first bracket where the wire member is slidably connected and the frontal lower pivotal point of the second bracket is positioned on a frontal side with respect to the positions of the both ends of the wire member.

8. The automobile pedal supporting structure according to claim 1, wherein the one of the connecting ends of the wire member is formed in a ring shape.

* * * * *